May 23, 1939.  L. H. BROWN  2,159,202

EXPOSURE METER

Filed Sept. 9, 1938

|       | A | B | C | D | E | F |
|-------|---|---|---|---|---|---|
| F 1.5 | 1/25 | 1/50 | 1/100 | 1/250 | 1/500 | 1/1000 |
| F 2.  | 1/10 | 1/25 | 1/50 | 1/100 | 1/250 | 1/500 |
| F 2.8 | 1/5 | 1/10 | 1/25 | 1/50 | 1/100 | 1/250 |
| F 4.  | 1/2 | 1/5 | 1/10 | 1/25 | 1/50 | 1/100 |
| F 5.6 | 1 | 1/2 | 1/5 | 1/10 | 1/25 | 1/50 |
| F 8.  | 2 | 1 | 1/2 | 1/5 | 1/10 | 1/25 |
| F 11. | 4 | 2 | 1 | 1/2 | 1/5 | 1/10 |
| F 16. | 8 | 4 | 2 | 1 | 1/2 | 1/5 |

DIMINISHING TRANSLUCENCY

GREATEST TRANSLUCENCY

INVENTOR.
Leo H. Brown
BY Mock & Blum
ATTORNEYS

Patented May 23, 1939

2,159,202

UNITED STATES PATENT OFFICE 2,159,202

EXPOSURE METER

Leo H. Brown, New York, N. Y.

Application September 9, 1938, Serial No. 229,098

2 Claims. (Cl. 88—23)

My invention relates to a new and improved exposure meter.

One of the objects of the invention is to provide an exposure meter of the extinction type, which will be extremely simple to make and to use.

Another object of the invention is to provide an exposure meter in the form of a chart, having a series of shutter speeds recorded in association with various stop numbers according to the "F" system, or any other standard system. In the "F" system the stop number indicates the fraction which the diameter of the diaphragm aperture is of the focal length of the lens which is being used. Thus F/8 means that the diameter of the aperture is one-eighth of the focal length.

Another object of the invention is to provide an exposure meter in the form of a single chart for determining the correct shutter-speed, so that it is unnecessary to refer to an additional chart attached to the exposure meter, after the reading has been taken. In present exposure meters, it is necessary to manipulate a movable part, and take the reading, and then refer the reading to a chart, or to provide the meter with a movable chart.

The improved device is therefore of extreme simplicity and it can be made at low cost.

Numerous other objects of the invention will be stated in the following description and drawings which illustrate preferred embodiments thereof, and methods of making the improved exposure meter.

Fig. 2 is a diagrammatic view illustrating how the exposure meter is made on a negative by photography, using the chart shown in Fig. 1.

Fig. 3 is a view showing the first step of producing the exposure meter, according to a second method.

Fig. 4 is a fragmentary perspective view of the assembled meter to indicate the varying translucency of same.

Fig. 5 is a view showing the second step in the second method of making the exposure meter.

Fig. 6 shows the elements of an exposure meter made according to the second method.

Figure 1:
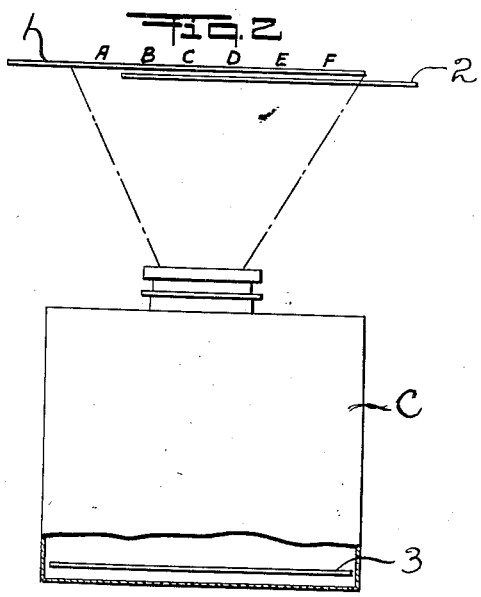
Fig. 1 is an elevation showing a chart which can be used in making said exposure meter by photography.
Figure 1:
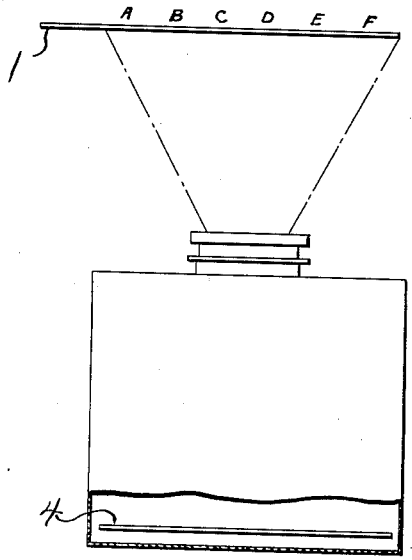
Figure 1:
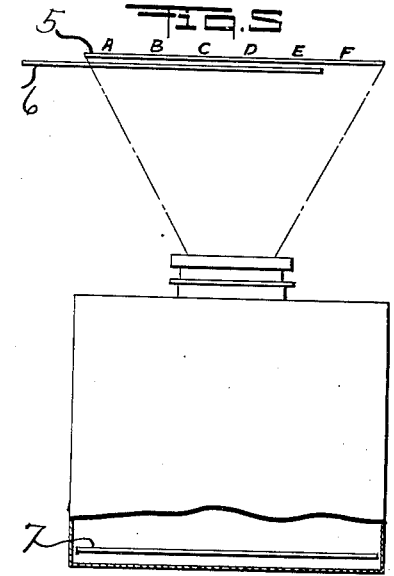
Figure 1:
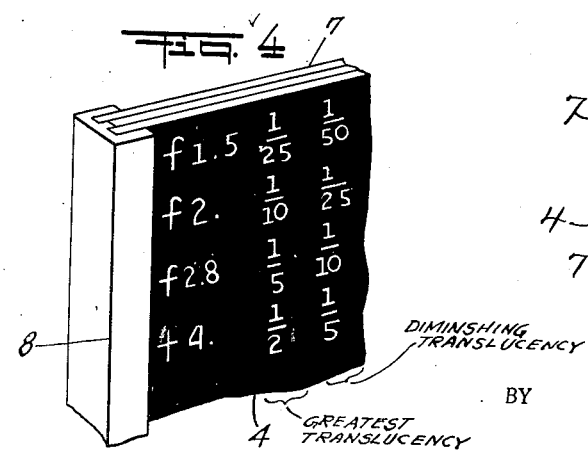
Figure 1:
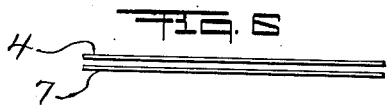

The numbers indicated in Fig. 1 can be printed in black opaque ink upon a sheet or chart 1, which is made of opaque white paper. The reference letters A–F, which indicate the respective vertical rows, do not appear on the chart 1 or upon the exposure meter, as these reference letters are only indicated in Fig. 1 in order to identify the respective vertical zones or rows. In making the first exposure, the rows B–F inclusive are covered by a mask 2, which is also made of opaque white paper, having the same reflecting power as the white opaque paper of the background of chart 1. The exposed row A is then photographed upon a film or plate 3, using an ordinary camera C. The time of exposure of the row A can be two seconds, for example, although this can be varied as desired. The mask 2 is then shifted so as to expose the rows A and B and to cover rows C–F inclusive and a second exposure is taken for an additional period of two seconds, so that after the second exposure the zone or row A has been exposed for four seconds, and the zone or row B has been exposed for two seconds. The mask 2 is thus shifted from left to right so as to successively and consecutively expose the zones or rows A–F, each exposure being for the same period of time, as two seconds for example. At the completion of the exposure, the zone or row A has been given six successive exposures of two seconds, so that the total period of exposure of zone or row A has been twelve seconds. The zone or row B has been exposed for ten seconds, the zone or row C has been exposed for eight seconds, the zone or row D has been exposed for six seconds, the zone or row E has been exposed for four seconds, and the zone or row F has been given a single exposure of two seconds.

The film 3 is then developed in the usual manner. This film is a negative of the chart 1. This negative will have a black opaque background of uniform density throughout said negative, because the chart 1 has a background of uniform white color throughout and the mask 2 is made of opaque white paper, which has the same color value as the opaque white background of the chart 1. The photographic impressions of the numbers on the negative 3 will be of varying density and light-permeability. These numbers are printed upon the chart 1, by means of black ink or a suitable dark ink of uniform color value throughout, so that said ink reflects little or none of the light which is used during the photography.

When the numbers of row A are photographed, the corresponding part of film 3 is wholly unexposed. When the numbers of row B are photographed, the corresponding part of the light-sensitive film 3 has previously been exposed for two seconds, so that there is some silver deposit in that area or part of the negative 3, on which the numbers of row B are to be photographed, before said numbers are exposed. Hence, when the numbers of row B are exposed and photographed on the light-sensitive film 3, the photographs of said numbers will be denser and less light-permeable than the numbers of row A. Hence the finished negative has an absolutely opaque and uniform black background, and the numbers in each horizontal row are of varying density or light-permeability, the smallest number in each horizontal row having the greatest density and the smallest light-permeability. Each number has some light-permeability, in contrast to the absolutely opaque black background. This negative is used as the exposure meter, so that any desired number of negatives can be made from a master chart.

In using the exposure meter, the photographer observes the numbers by means of transmitted light which passes through said numbers, in contrast with the opaque black background of the exposure meter. If the light is extremely strong, the photographer can see all the numbers in a selected horizontal row and he will therefore set the shutter-speed in accordance with the smallest number which is visible at the right-hand end of said horizontal row, so as to have the highest shutter-speed, and the shortest time of exposure. If the light is weak, one or more of the right-hand numbers in a selected horizontal row will be invisible, and the photographer will then select a shutter-speed corresponding to the lowest visible number and the shortest time of exposure. For example, if the stop number is "F2" and the last two right-hand numbers in the corresponding horizontal row are invisible and the other numbers are visible, the shutter-speed is set for an exposure time of $1/100$ of a second, since this is the smallest number visible in said horizontal row.

The numbers are selected so that the proper exposure periods for the different stop numbers are in vertical rows. For example, if the stop-number is "F2" and the smallest visible number in the corresponding horizontal row is $1/100$, then the number $1/25$ would indicate the correct exposure period under the same condition of external light, if the stop number were "F4".

According to the second method and as illustrated in Fig. 3, the entire chart which is shown in Fig. 1 is photographed upon a first film 4, using a single exposure period for the entire chart. This produces a negative film 4 having a black opaque background and having the numbers photographed thereon with uniform light-permeability. A second negative 7 is then prepared, using the background member 5, and also using a black mask 6. This background member 5 is made of opaque white paper which may have the same reflecting power as the white opaque background of the chart 1 which has been used in making the first negative film 4. However, this is not necessary. In making the second negative film 7, the black opaque mask 6 is first held as shown in Fig. 5 so as to expose the vertical zone of the background member 5 which corresponds to the zone F. This background member 5 is of the same size as that portion of the chart 1 in which the rows A-F inclusive are located. The first zone of the background member 5 can be exposed for a suitable period, as two seconds for example. The black opaque mask 6 is then shifted so as to expose the zones of the background member 5 which corresponds to the zones of the rows E and F, and the film 7 is then exposed again during the same period as the first exposure. The mask 6 is shifted consecutively from right to left so that when the series of exposures have been completed, the first zone of the member 5 (corresponding to the row F of the chart) will have been exposed for twelve seconds, and the last zone of said member 5 (corresponding to the row A of the chart) will have been exposed only for two seconds. The black mask will not be recorded upon the negative 7, since it does not reflect any light. The negative film 7 will therefore have vertical zones of varying density or light-permeability. The zone of the negative 7 which corresponds to the zone F will have the greatest density and least light-permeability and the zone of the negative which corresponds to the zone A will have the smallest density and greatest light-permeability.

Instead of producing a member of varying density or light-permeability by photographic means, like member 7, this can be done by forming member 7 with superposed layers of light-permeable material.

The rows of numbers A-F in chart 1 can be printed by using inks of varying reflective power, so that the numbers in row A reflect none of the light, and the numbers in row F have the maximum light-reflecting power of said rows. The numbers in each vertical row have uniform light-reflecting power and the light-reflecting power of the numbers in row F is less than that of the opaque white background. A single exposure of the entire chart will then produce a negative which can be used as an exposure meter.

Referring to the second method, the use of the black mask can be eliminated, by providing a background member 5 having zones of varying light-permeability so that a single exposure thereof will produce the negative 9.

When the assembled negatives 4 and 7 are viewed by transmitted light, using a lens to read the numbers, the numbers of zone F will be visible only if the light is very strong, and the numbers of row A will be visible under very faint light.

The markings of the shutter-speeds could be in the vertical row at the extreme left of the meter, and the horizontal rows which now indicate shutter-speeds could indicate different stop numbers. This equivalent is within the scope of the appended claims.

The rows need not be straight, and they need not be horizontally and vertically arranged.

The members 4 and 7 can be held assembled by a frame 8 such as shown in Figure 6, or any other means, in contact with each other. In actual use, they contact, or they are very close to each other.

In each embodiment, whether it consists of one member, or a plurality of assembled members, the exposure meter has an opaque background. The device has a first row of light-permeable stop numbers, this being the extreme left-hand row in Fig. 1, in the embodiments which have been illustrated. Each stop number has an associated row of markings which respectively indicate different exposure periods. In the embodiments shown herein, these markings are numerical, and they are arranged in horizontal rows in the order of their respective numerical values. The markings of highest numerical value are located at corresponding ends of said horizontal rows, said ends being the left-hand ends of the horizontal rows in the embodiments illustrated herein. The individual markings of the horizontal rows are also located in zones, said zones being of equal width and being vertical in said embodiments, so that said zones make angles with the horizontal rows. Each marking of exposure time is located in an area of the exposure meter and said areas are of different light-permeability in each horizontal row and said areas are of equal light-permeability in each vertical zone. The light-permeability of the areas in each zone is selected so that if one marking is visible in a vertical zone the other markings in the respective vertical zone are also visible and the smallest number which is visible in any of the horizontal rows indicates the correct exposure period for the respective stop number.

Numerous changes and omissions can be made in the preferred embodiments without departing from the invention. I prefer the embodiment which has a plurality of members, as this is superior in many respects to a device which has only a single member.

I claim:

1. An exposure meter having an opaque background and a first row of light-permeable stop-numbers, each stop-number having an associated row of light-permeable markings, the markings in each row respectively indicating different exposure periods and being arranged in the order of their respective numerical values, the markings of highest numerical value being located at corresponding ends of said associated rows, markings of said associated rows being also arranged and located in zones which make angles with said associated rows, said exposure meter having different light-permeabilities along said associated rows at the areas occupied by said markings, said light-permeabilities being equal in each zone, the light-permeabilities of said areas corresponding to the numerical values of the respective markings so that if one marking is visible under transmitted light in a zone, the other markings in said zone are also visible and the areas occupied by the smallest numbers having the smallest light-permeability, and the smallest visible number in an associated row indicates the correct exposure time for the associated stop-number, with the use of said transmitted light.

2. An exposure meter according to claim 1, having two members, the first member having an opaque background and having said markings located thereon and of uniform light-permeability, the second member having zones of different light-permeability which register with the zones of the first member, the light-permeability of the zones of the second member being different and corresponding to the numerical values of the numbers in registration therewith, so that the zone of the second member which registers with the markings of smallest value has the smallest light-permeability.

LEO H. BROWN.